June 5, 1951  D. D. ROBERTS  2,556,106
PORTABLE HEATER, COOKER AND FOOD WARMER
Filed July 20, 1950  2 Sheets-Sheet 1
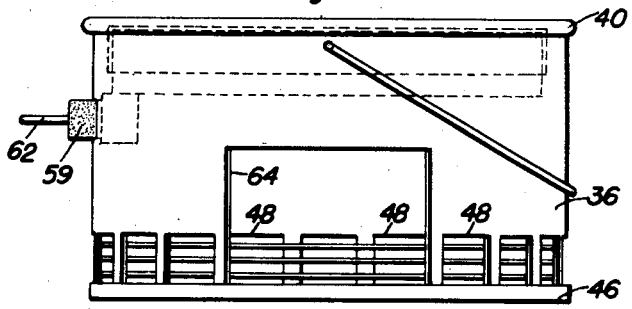
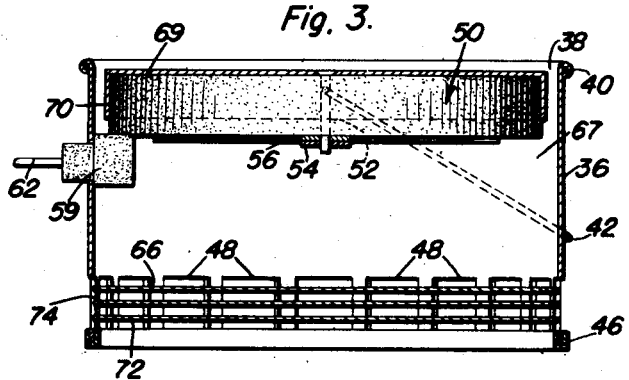
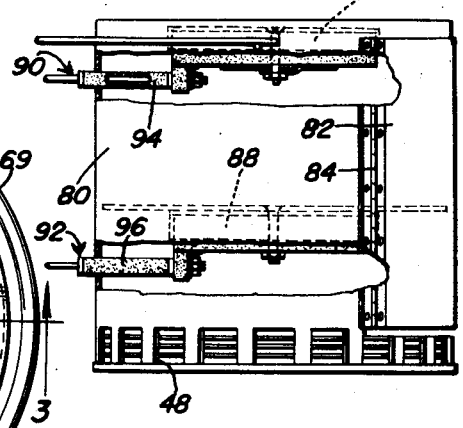
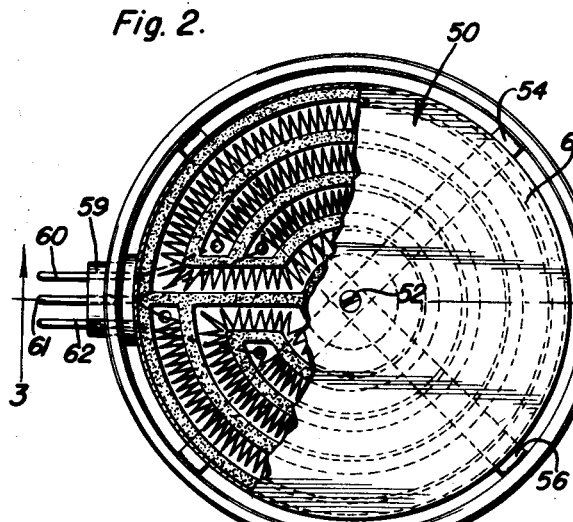
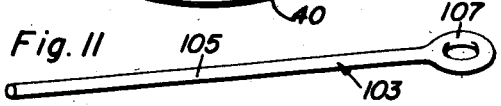
Darling D. Roberts
INVENTOR.
BY *James A. O'Brien and Harvey B. Jackson*
Attorneys June 5, 1951  D. D. ROBERTS  2,556,106
PORTABLE HEATER, COOKER AND FOOD WARMER
Filed July 20, 1950  2 Sheets-Sheet 2

Darling D. Roberts
INVENTOR.

Patented June 5, 1951

2,556,106

UNITED STATES PATENT OFFICE 2,556,106

PORTABLE HEATER, COOKER, AND FOOD WARMER

Darling D. Roberts, Cross City, Fla.

Application February 20, 1950, Serial No. 145,107

2 Claims. (Cl. 219—37)

This invention relates to improvements in heaters.

An object of this invention is to accommodate a large number of attachments for dispersing heat, holding pots or other implements or for various analogous uses so that cooking and heating may take place more effectively and more easily.

Another object of this invention is to provide an improved heating unit which has one or more heating elements therein, said elements being held in place by means of hangers for the elements in a case, the case having air circulation openings adjacent the bottom thereof and an access door therein in order to place and remove various elements or food for cooking and heating purposes.

Another object of this invention is to energize certain sections or all of the sections of the heating unit through employment of a series of prongs, selected ones of which are used, said prongs being connected with portions of the heating unit.

Other objects and features will become manifest in following the description of the illustrations.

In the drawings:

Figure 1 is an elevational view of the device;

Figure 2 is a plan view of the device with portions broken away to illustrate detail of construction;

Figure 3 is a sectional view taken on the line 3—3 of Figure 2 and in the direction of the arrows;

Figure 10 is an elevational view of a modification of the invention, portions being broken away to illustrate detail of construction.

Figure 11 is a perspective view of an alternative prong which may be used for connection with another manufacturer's make heating unit.

In the accompanying drawings and in Figures 4–9 there are several attachments which may be used in conjunction with the invention. The attachment of Figures 4 and 5 consits of an annular metallic band 10 which is overlapped at its ends and which is provided with a series of apertures 12. A bolt 14 is passed through two of the apertures and there is a wing nut 16 provided on the bolt. By utility of this construction, the effective diameter of the band may be regulated and adjusted to accommodate different sizes of pots or pans as illustrated in phantom in Figure 4.

Figure 6:
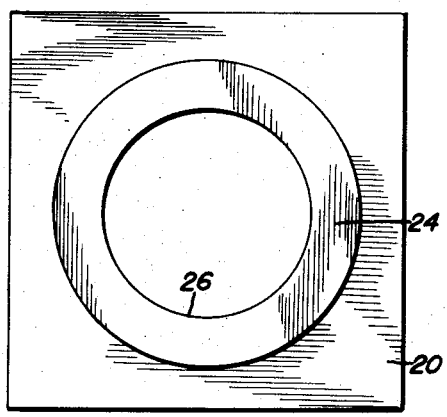
Figure 6 is a plan view of another attachment.
Figure 7:
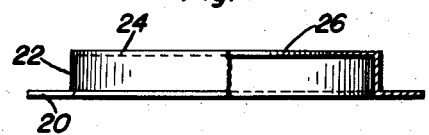
Figure 7 is an elevational view of the attachment of Figure 6 with portions broken away in section to show detail of construction.
Figure 4:
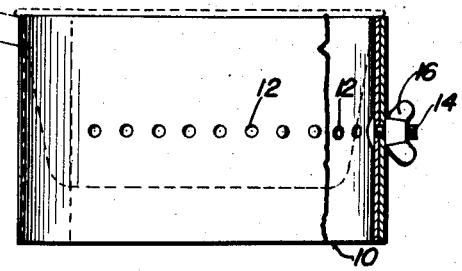
Figure 4 is an elevational view of one attachment, portions being broken away in section, said attachment being employed in conjunction with the unit in Figure 1.
Figure 5:
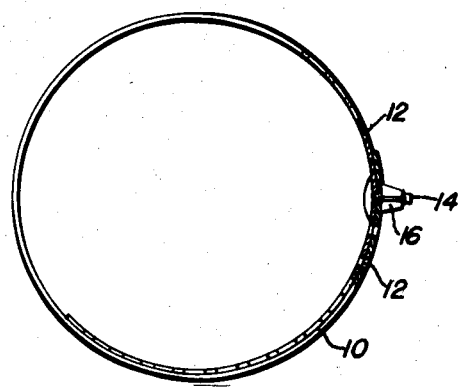
Figure 5 is a plan view of the attachment in Figure 4.

Another attachment is shown in Figures 6 and 7. The attachment consists of a base plate 20 which has an annular collar 22 rising from the center thereof and a horizontal flange 24 extending from the upper edge of the collar 22. The horizontal flange has a central opening 26 defined thereby which is adapted to accommodate pots, pans or the like. This attachment may be used inverted in one direction or the other, as found desirable.

Figure 8:
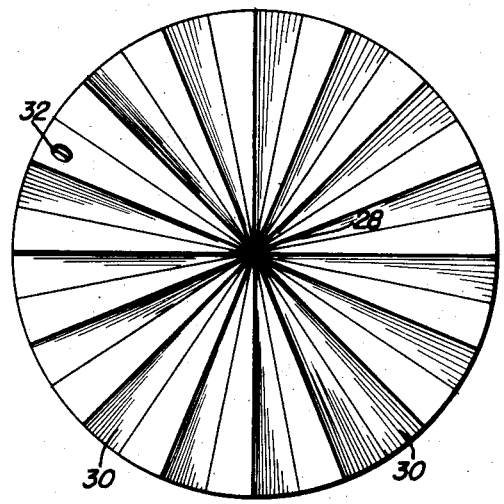
Figure 8 is a plan view of a further attachment.
Figure 9:
Figure 9 is an elevational view of the attachment of Figure 8.

Reference is now made to Figures 8 and 9. Here a heat spreader is supplied. The general shape of the heat spreader is circular. The center point 28 has a plurality of radially disposed substantially V-shaped sections 30 extending therefrom. These sections are at a minimum height or thickness at the center and gradually increase to the periphery. An opening 32 is supplied in one of the sections in order to accomodate a conventional handle for removal and disposition of the device and for general handling thereof.

Reference is now made to Figures 1–3. One form of the invention is illustrated and consists of a case 36 which is substantially cylindrical in shape. The case has an open upper end 38 with a rolled flange 40 extending therearound. A handle 42 is pivoted to the case and operable over the open top 38 of the case 36.

A channel 46 is disposed at the lower end of the casing 36 and forms a foot for the device. This channel covers the rough and sharp bottom edge of the case 36.

A plurality of air circulation openings 48 are supplied adjacent the lower end of the housing or case 36 and in the side thereof. These openings are adapted to conduct cool air during air circulation when the heating unit generally indicated at 50 is energized.

Said heating unit has a center bolt 52 passed therethrough which also passes through the intersecting cross members 54 and 56 which form a web for the disposition of the heating unit 50. Said members 54 and 56 are welded or otherwise rigidly fixed to the internal surface of the case 36 adjacent the open top 38 thereof and the bolt 52 passes through the intersecting portions thereof.

An opening (unnumbered) is provided in the case to accommodate the prong block 59. This block is of insulating material and is connected with the heating unit 50. There are three prongs 60, 61 and 62 extending from the insulating block. Pairs of these prongs are adapted to be connected with an external source of current. Inspection of Figure 2 shows that selection of different pairs of prongs for use will energize a different number of resistor wires in the heating unit 50 thereby providing for a selection in the amount of heat which is given off by the heating unit during operation.

An opening 64 is provided in the case 36 and may have a door therein. This opening communicates the interior of the case with the exterior and is used for the purpose of passing pots, pans or other devices or food therethrough so that it may be disposed on the horizontal shelf 66. The purpose of having the food, or pots or pans therein is to keep the contents of the pots or pans or the actual food warm or heat the food to the point of cooking and to form a toasting and broiler oven.

The heating unit 50 is spaced from the interior surface of the wall of the case 36 (see Fig. 3) in order to form an air passage and allow air circulation through the openings 48, the heating chamber 67 and ultimately through the open top of the case.

A cover 69 is disposed on the heating unit 50 and has a downturned skirt 70 extending around the periphery thereof. This skirt forms a seat for the various attachments shown in Figures 4-9 and for ordinary pots and pans or dishes with food to be maintained in a heated condition.

The horizontal shelf 66 acts as a baffle for conduction of heat. There are several similar horizontal shelves 72 and 74 disposed therebelow which serve in a similar capacity. These horizontal shelves 72 and 74 act in the nature of baffles for the heat which is generated by the heating unit 50.

Reference is now made to Figure 10. The case 80 is very similar to the case 36 with the exception that it is higher. The door 82 is mounted on a hinge 84 for the access opening (unnumbered) in the case 80.

This modification of the invention includes two heating units 86 and 88 rather than the single unit 50 as described previously. The two sets 90 and 92 of three prongs each pass through openings in the housing 80. These prongs extend from insulating blocks 94 and 96 which are attached to the undersurfaces of the heating units 86 and 88.

In all other respects, the device is substantially identical to that previously described and illustrated in Figures 1-3.

Reference is now made to Figure 11. The prong 103 is illustrated and consists of a shank 105 with an eye 107 at one end thereof. This prong is to be substituted for the prongs illustrated in other figures of the drawings when it is desired to employ another manufacturer's make of heating unit in lieu of the heating unit 50.

Having described the invention, what is claimed as new is:

1. A heating device comprising a case having a side wall with a plurality of air circulation openings adjacent the bottom thereof, a number of horizontal shelves in said housing and located adjacent said openings and constituting air baffles, said housing having an open top, a heating unit, means retaining said heating unit in said open top and above said shelves, an electrical plug connected with said unit, said plug having three prongs, combinations of which energize portions of said unit for selected heat output of said unit, the lower edge of said wall forming a support for said case, and an access door in the side wall of said case.

2. The combination of claim 1 and said heating unit retaining means comprising a pair of cross members secured to said wall and having a bolt connected therewith, said bolt passing through an opening in said heating unit, and a cover having a downturned skirt disposed on said heating unit and spaced from the wall of said case thereby providing an air passage between the inside surface of the wall of said case and the outer edge of said heating unit.

DARLING D. ROBERTS.

REFERENCES CITED

The following references are of record in the file of this patent:

UNITED STATES PATENTS

| Number | Name | Date |
| --- | --- | --- |
| 1,359,275 | Robertson | Nov. 16, 1920 |
| 1,363,227 | Boyd et al. | Dec. 28, 1920 |
| 1,659,986 | Baughman et al. | Feb. 21, 1928 |
| 1,751,219 | Seamon | Mar. 18, 1930 |
| 2,386,426 | Brannon | Oct. 9, 1945 |